United States Patent
Syed et al.

(10) Patent No.: US 7,809,487 B2
(45) Date of Patent: Oct. 5, 2010

(54) METHOD AND SYSTEM FOR CONTROLLING A MOTIVE POWER SYSTEM OF AN AUTOMOTIVE VEHICLE

(75) Inventors: Fazal Urrahman Syed, Canton, MI (US); Ming Lang Kuang, Canton, MI (US); Venkatapathi Raju Nallapa, West Bloomfield, MI (US); Kerry Eden Grand, Chesterfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 11/855,486

(22) Filed: Sep. 14, 2007

(65) Prior Publication Data

US 2009/0076697 A1    Mar. 19, 2009

(51) Int. Cl.
*G06F 19/00* (2006.01)

(52) U.S. Cl. .......................................... 701/70; 706/12

(58) Field of Classification Search ............. 701/70, 701/96; 706/20, 12
See application file for complete search history.

(56) References Cited

U.S. PATENT DOCUMENTS

| | | | |
|---|---|---|---|
| 4,862,854 A | 9/1989 | Oda et al. | |
| 5,172,785 A | 12/1992 | Takahashi | |
| 5,410,477 A * | 4/1995 | Ishii et al. | 701/48 |
| 5,566,072 A | 10/1996 | Momose et al. | |
| 5,939,794 A | 8/1999 | Sakai et al. | |
| 5,991,675 A | 11/1999 | Asanuma | |
| 6,131,064 A | 10/2000 | Vieweg | |
| 6,507,780 B2 * | 1/2003 | Graf | 701/51 |
| 6,553,301 B1 | 4/2003 | Chhaya et al. | |
| 6,561,295 B1 | 5/2003 | Kuroda et al. | |
| 6,852,063 B2 | 2/2005 | Takahashi et al. | |
| 6,879,969 B2 * | 4/2005 | Engstrom et al. | 706/20 |
| 7,444,311 B2 * | 10/2008 | Engstrom et al. | 706/20 |
| 2005/0159851 A1 | 7/2005 | Engstrom et al. | |
| 2007/0005404 A1 * | 1/2007 | Raz et al. | 705/4 |
| 2007/0112500 A1 * | 5/2007 | Ogawa | 701/96 |
| 2007/0213886 A1 | 9/2007 | Zhang et al. | |

FOREIGN PATENT DOCUMENTS

| | | |
|---|---|---|
| DE | 102006035424 A1 | 5/2007 |
| EP | 1780090 A1 | 2/2007 |
| EP | 1811481 A1 | 7/2007 |
| JP | 01-113561 | 2/1989 |

* cited by examiner

*Primary Examiner*—Mark Hellner
(74) *Attorney, Agent, or Firm*—David B. Kelley; Brooks Kushman P.C.

(57) ABSTRACT

A motive power system of a vehicle is controlled based on a driving style of a driver of the vehicle. Parameters related to a state of the vehicle are used as inputs to a fuzzy controller in order to characterize the driving style of the driver of the vehicle.

13 Claims, 3 Drawing Sheets

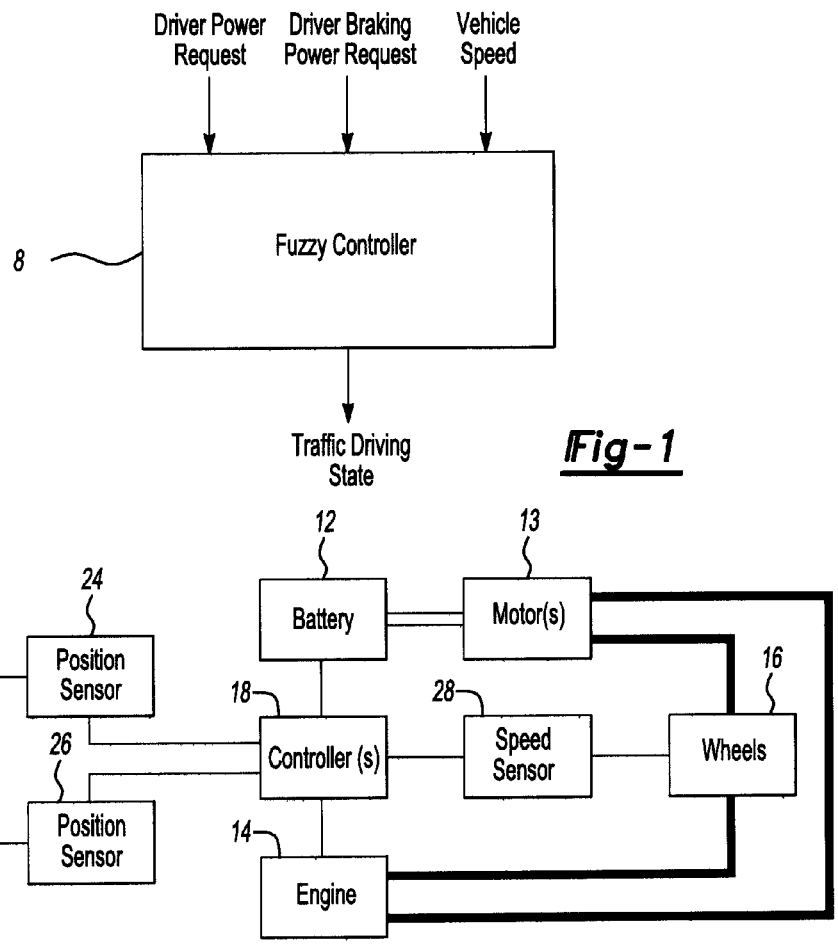

| Antecedent | | | | | | | Consequent |
|---|---|---|---|---|---|---|---|
| $|P_p - P_n|$ | $\Delta tvh\_u$ | $\Delta tvm\_u$ | $\Delta tvl\_u$ | $\Delta tvh\_l$ | $\Delta tvm\_l$ | $\Delta tvl\_l$ | Traffic-Drive State |
| Small | Small | Small | Small | Small | Small | Small | Initial State |
| Small | Small | Small | Small | Large | Small | Small | Steady High Speed Traffic-Driving |
| Small | Small | Small | Small | Large | Large | Large | Steady Low Speed Traffic-Driving |
| Small | Small | Small | Large | Large | Large | Small | Steady Medium-Low Speed Traffic-Driving |
| Small | Small | Large | Large | Large | Small | Small | Steady Low-Medium Speed Traffic-Driving |
| Large | Small | Small | Small | Small | Small | Small | Initial State |
| Large | Small | Small | Small | Large | Small | Small | Accel/Decel High Speed Traffic-Driving |
| Large | Small | Small | Small | Large | Large | Large | Stop/Go Low Speed Traffic-Driving |
| Large | Small | Small | Large | Large | Large | Small | Accel/Decel Low-Medium Speed Traffic-Driving |
| Large | Small | Large | Large | Large | Small | Small | Accel/Decel Medium-High Speed Traffic-Driving |

Fig-3

METHOD AND SYSTEM FOR CONTROLLING A MOTIVE POWER SYSTEM OF AN AUTOMOTIVE VEHICLE

BACKGROUND

1. Field of the Invention

The invention relates to methods and systems for controlling motive power systems of automotive vehicles.

2. Discussion

Driving in congested areas may result in frequent vehicle stops and starts. Driving in non-congested areas may result in steady vehicle speeds.

A navigation system and distance sensor may be used to determine whether a vehicle is being driven in a congested area. For example, the navigation system may indicate the area in which the vehicle is being driven and the distance sensor may indicate the proximity of other vehicles in that area. A navigation system and distance sensor, however, may add cost and weight to the vehicle.

SUMMARY

Embodiments of the invention may take the form of a method for controlling a motive power system of a vehicle. The method includes determining an acceleration/deceleration history of the vehicle and controlling the motive power system based on the acceleration/deceleration history of the vehicle.

Embodiments of the invention may take the form of a method for controlling a motive power system of a vehicle. The method includes receiving input from at least one of an accelerator pedal and brake pedal, determining a driving style of a driver of the vehicle based on the input, and controlling the motive power system based on the driving style of the driver.

BRIEF DESCRIPTION OF THE DRAWINGS

FIG. 1 is a block diagram of an example fuzzy controller.

FIG. 2 is a block diagram of an example alternatively powered vehicle.

FIG. 3 is a table of example rules implemented by the fuzzy controller of FIG. 1.

DETAILED DESCRIPTION

Figure 4:
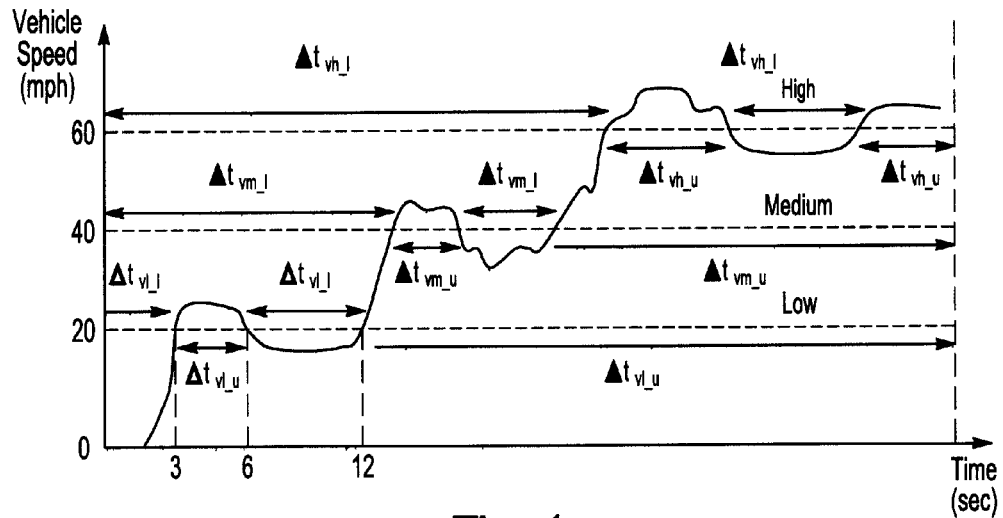
FIG. 4 is an example plot of vehicle speed versus time.

Embodiments of the invention may determine a traffic-driving state of a vehicle by interpreting driver inputs to the vehicle, e.g., pedal position, rate of change of pedal position, vehicle speed, distance traveled, time between braking and/or acceleration, etc.

Traffic-driving state information may be used to improve fuel economy by modifying engine start/stop behavior and powertrain operating point determinations. If, for example, a vehicle is being driven such that it will experience engine shutdowns, e.g., the vehicle is operating in electric mode, the engine start-ups and shut-downs, the powertrain operating mode, and the battery power request determinations may be optimized to provide better fuel economy.

FIG. 1 is a block diagram of nonlinear Multiple Input Single Output (MISO) Singleton Mamdami fuzzy controller 8. Fuzzy controller 8 of FIG. 1 may be used to determine a traffic-driving state based on several vehicle parameters, e.g., driver power request, driver braking power request, vehicle speed, etc. Driver power request may be based, for example, on an accelerator pedal position. Driver braking power request may be based, for example, on a brake pedal position. Vehicle speed may be based, for example, on an output shaft speed. In alternative embodiments, other algorithms, e.g., look up functions, adaptive controls, neural networks, may be used.

The output of fuzzy controller 8, and other fuzzy controllers, may be converted to a crisp value with the following defuzzier:

$$U(n) = K_u \frac{\sum_{j=1}^{\Omega} \mu_j^\alpha(x, \tilde{A}) \cdot h(I_{1,j}, \ldots, I_{M,j})}{\sum_{j=1}^{\Omega} \mu_j^\alpha(x, \tilde{A})}$$

where, $\tilde{A}$ is a vector involving all the input fuzzy sets, $\mu_j^\alpha$ is the combined membership value from the antecedent of the jth rule, and represents the output fuzzy sets, and $\alpha$ is a design parameter with a value of 1.

Traffic conditions may be determined, for example, based on the distance traveled, time elapsed, and top vehicle speed between two stop events. For example, if a vehicle travels 20 meters in 300 seconds and achieves a top speed of 2 miles per hour, heavy traffic conditions may be inferred.

FIG. 2 is a block diagram of hybrid electric vehicle (HEV) 10. HEV 10 of FIG. 2 is an example vehicle used to describe the control strategies discussed herein. Other types of vehicles, e.g., electric, fuel cell, conventional, etc., may also employ these strategies.

HEV 10 includes battery 12, motor(s) 13, engine 14, wheels 16, and controller(s) 18, e.g. battery control module, engine control unit, etc. As discussed below, controller(s) 18 controls the operation of battery 12 and engine 14 such that either or both of battery 12 and engine 14 provide motive power to wheels 16, as indicated by heavy line. Engine 14 may also provide mechanical power to motor(s) 13. HEV 10 also includes accelerator pedal 20, brake pedal 22, and position sensors 24, 26. Position sensors 24, 26 sense the position of pedals 22, 24 respectively and broadcast this information. Speed sensor 28 senses the speed of wheels 16 and broadcasts this information. Controller(s) 18 reads this position and speed information and uses it, as discussed below, as input to control strategies for controlling battery 12 and engine 14.

Controller(s) 18 of FIG. 2 communicates with battery 12, engine 14, position sensors 24, 26 and speed sensor 28 via a car area network, as indicated by light line. In alternative embodiments, controller(s) 18 may communicate with battery 12, engine 14, position sensors 24, 26, and speed sensor 28 via hard wire, wireless, or some combination thereof.

Controller(s) 18 of FIG. 2 determines the driving style of a driver of HEV 10 and controls battery 12 and engine 14 based on this information. For example, controller(s) 18 may count the number of times accelerator pedal 20 and/or brake pedal 22 is pressed during some calibratable time period, e.g., 1 minute. If, for example, brake pedal 22 is pressed more than some predetermined period of times, e.g., 4, controller(s) 18 may determine that the driver has a tendency to frequently accelerate and decelerate. Otherwise, controller(s) 18 may determine that the driver has a tendency to drive steady. Controller(s) 18 may also, for example, employ fuzzy techniques to determine whether the driver frequently accelerates and decelerates for a range of vehicle speeds.

FIG. 3 is an example rule-based table used in such fuzzy control to determine the driver state, e.g., consequent, based on measures of driver demanded power and vehicle speed, e.g., antecedents. In the example table of FIG. 3, the variables are defined as follows:

$P_p$: Positive power change demand history
$P_n$: Negative power change demand history
$\Delta t_{vl\_u}$: Time duration for which vehicle speed is above a low threshold
$\Delta t_{vl\_l}$: Time duration for which vehicle speed is below the low threshold
$\Delta t_{vm\_u}$: Time duration for which vehicle speed is above a medium threshold
$\Delta t_{vm\_l}$: Time duration for which vehicle speed is below the medium threshold
$\Delta t_{vh\_u}$: Time duration for which vehicle speed is above a high threshold
$\Delta t_{vh\_l}$: Time duration for which vehicle speed is below the high threshold Accordingly, if, for example, all antecedents are "small," the consequent "initial state" is returned. If, for example, some antecedents are "small" and some are "large," a different consequent is returned. In other embodiments, different rules may be used, e.g., the antecedents may take on small, medium, or large values, there may be a different number of antecedents, etc.

Counters may be used to determine the time durations, e.g., $\Delta_{tvl\_u}$, described with reference to FIG. 3. For example, FIG. 4 is a plot of the speed of HEV 10 versus time. For each time increment, e.g., 1 second, a binary counter may determine whether the speed of HEV 10 is above or below a "low" threshold, e.g., 20 m.p.h. If the speed of HEV 10 is above 20 m.p.h., the counter returns a zero (0). If the speed of HEV 10 is below 20 m.p.h., the counter returns a one (1). For a calibratable time period, e.g., 40 seconds, the returned 0's and 1's are summed to determine the time duration. In the instant example, $\Delta L_{tvl\_u}$=9 seconds. Other counters may also be used. For example, if the speed of HEV 10 is above 20 m.p.h., a counter associated with $\Delta_{tvl\_u}$ is not incremented. If the speed of HEV 10 is below 20 m.p.h., the counter is incremented.

For each calibratable time period, the time durations may be evaluated as described above. Whether a given time duration, e.g., $\Delta_{tvl\_u}$, is "small," "medium," or "large" may be determined, for example, based on the following table:

TABLE 1

| Low | Medium | High |
|---|---|---|
| $\Delta t_{vl\_u}$ <3 sec. | 3 sec. ≦ $\Delta t_{vl\_u}$ ≦ 7 sec. | $\Delta t_{vl\_u}$ >7 sec. |
| $\Delta t_{vl\_l}$ <3 sec. | 3 sec. ≦ $\Delta t_{vl\_l}$ ≦ 7 sec. | $\Delta t_{vl\_l}$ >7 sec. |
| $\Delta t_{vm\_u}$ <3 sec. | 3 sec. ≦ $\Delta t_{vm\_u}$ ≦ 7 sec. | $\Delta t_{vm\_u}$ >7 sec. |
| $\Delta t_{vm\_l}$ <3 sec. | 3 sec. ≦ $\Delta t_{vm\_l}$ ≦ 7 sec. | $\Delta t_{vm\_l}$ >7 sec. |
| $\Delta t_{vh\_u}$ <3 sec. | 3 sec. ≦ $\Delta t_{vh\_u}$ ≦ 7 sec. | $\Delta t_{vh\_u}$ >7 sec. |
| $\Delta t_{vh\_l}$ <3 sec. | 3 sec. ≦ $\Delta t_{vh\_l}$ ≦ 7 sec. | $\Delta t_{vh\_l}$ >7 sec. |

In alternative embodiments, "Low," "Medium," and "High" may be defined differently.

$P_p$ and $P_n$ are based on the power demanded changes by the driver. The absolute difference between them, e.g., $|P_p-P_n|$, may be an indicator as to whether the driver has a tendency to drive steady or whether the driver has a tendency to frequently accelerate and decelerate. For example, if $|P_p-P_n|$ is "small," the driver is driving steady. If $|P_p-P_n|$ is "large," the driver is accelerating and/or decelerating. Whether $|P_p-P_n|$ is "small" or "large" may be determined, for example, based on the following table:

TABLE 2

| Small | Large |
|---|---|
| $|P_p - P_n| < 10$ kW-hr | $|P_p - P_n| \geq 30$ kW-hr |

In alternative embodiments, "Small" and "Large" may be defined differently.

Figure 5:
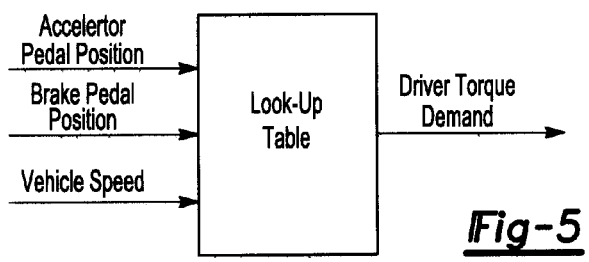
FIGS. 5-8 are schematic diagrams of control blocks implemented by the fuzzy controller of FIG. 1.

FIG. 5 is a schematic diagram of control block 30 implemented by controller(s) 18. Control block 30 of FIG. 5 takes as input accelerator pedal position, brake pedal position, and vehicle speed. With these inputs, control block 30 inspects, for example, a look-up table in controller memory and gives, as output, torque demanded by the driver. In alternative embodiments, control block 30 may, for example, calculate torque demanded by the driver based on the inputs. Other techniques may also be used.

Figure 6:
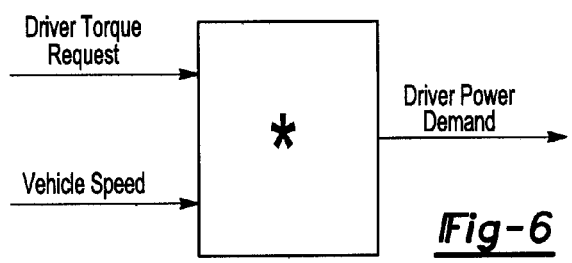

FIG. 6 is a schematic diagram of control block 32 implemented by controller(s) 18. Control block 32 of FIG. 6 takes as input torque demanded by the driver and vehicle speed. With these inputs, control block 32 calculates, e.g., multiplies the inputs, power demanded by the driver. In alternative embodiments, control block 32 may, for example, inspect a look-up table in controller memory to determine the power demanded by the driver. Other techniques may also be used.

Figure 7:
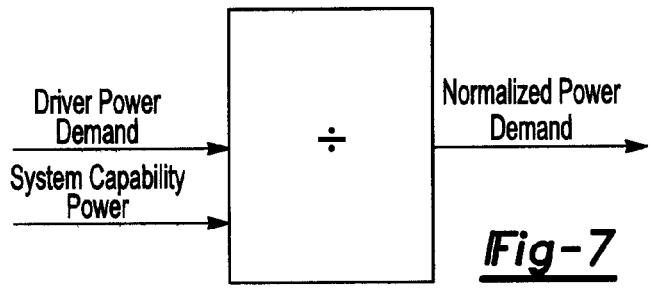

FIG. 7 is a schematic diagram of control block 34 implemented by controller(s) 18. Control block 34 of FIG. 7 takes as input power demanded by the driver and system capability power, e.g., the maximum power that may be delivered by battery 12 and engine 14. With these inputs, control block 34 calculates, e.g., divides the inputs, normalized power demand.

Figure 8:
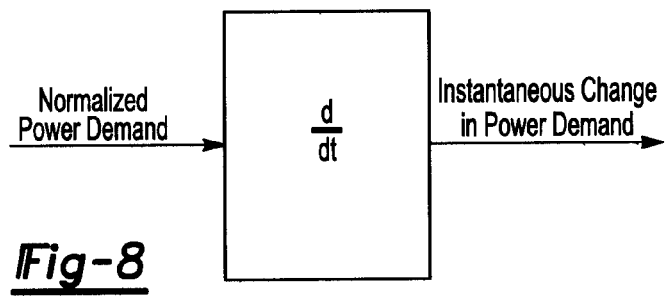
Figure 9:
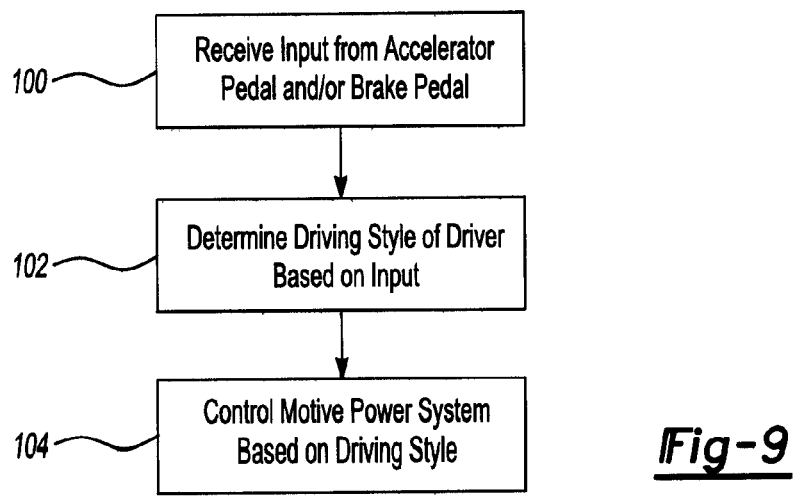
FIG. 9 is a flow chart of an example strategy for controlling a motive power system of a vehicle.

FIG. 8 is a schematic diagram of control block 36 implemented by controller(s) 18. Control block 36 of FIG. 8 takes as input normalized power demand. Control block 36, for example, differentiates this input to calculate instantaneous change in power ($P_i$).

Control blocks 30, 32, 34, 36 may perform these calculations. For example, ℜ represents the real number set vectors and every second yields a series of $P_i$ values in that vector space, e.g., $P_0$, $P_1$, $P_2$, etc. In the instant example, positive values of $P_i$ are stored in a first-in-first-out (FIFO) buffer of calibratable size, e.g., 20 values. Likewise, negative values of $P_i$ are stored in a first-in-first-out (FIFO) buffer of calibratable size, e.g., 20 values. These buffered $P_i$ values may be summed over some calibratable time frame to yield $P_p$ and $P_n$:

$$P_p = \sum_{T_{cal}} \left( \frac{\Delta P_i}{\Delta t} \in \mathbb{R} \,\bigg|\, 0 \leq \frac{\Delta P_i}{\Delta t} < \infty \right)$$

$$= \sum_{T_{cal}} \left( \frac{P_i - P_{i-1}}{\Delta t} \in \mathbb{R} \,\bigg|\, 0 \leq \frac{P_i - P_{i-1}}{\Delta t} < \infty \right)$$

when $\Delta P_i$ is positive

-continued $$P_n = \sum_{T_{cal}} \left( \frac{\Delta P_i}{\Delta t} \in \mathbb{R} \,\middle|\, -\infty < \frac{\Delta P_i}{\Delta t} \leq 0 \right)$$

$$= \sum_{T_{cal}} \left( \frac{P_i - P_{i-1}}{\Delta t} \in \mathbb{R} \,\middle|\, -\infty < \frac{P_i - P_{i-1}}{\Delta t} \leq 0 \right)$$

when $\Delta P_i$ is negative

Controller(s) 18 of FIG. 2 may adjust operating parameters associated with battery 12 and engine 14 based on the information determined above. If, for example, the driver is frequently stopping and driving at low speeds, controller(s) 18 may heavily charge battery 12 while engine 14 is on so that controller(s) 18 can rely on this increased battery charge to move HEV 10 in such stop and go, low speed traffic to reduce emissions.

If, for example, a traffic-drive state of steady high speed traffic-driving (FIG. 3) is detected, controller(s) 18 may operate battery 12 around charge neutral to achieve maximum system efficiency/fuel economy.

If, for example, a traffic-drive state of accel/decel high speed traffic-driving is detected, controller(s) 18 may fill-in for such changes in driver demand through battery 12 while operating engine 14 at a steady state operating condition. This steady state engine operation may result in improved overall fuel efficiency.

If, for example, a traffic-driving state of steady low speed traffic-driving is detected, controller(s) 18 may operate engine 14 in a pure electric mode. When the state of charge of battery 12 is below a certain desired value, then engine 14 will be turned on to operate at a steady state operating condition to charge battery 12. Such a mechanism may also result in improved fuel efficiency while maintaining drivability.

If, for example, a traffic-driving state of stop/go low speed traffic-driving is detected, then controller(s) 18 may operate engine 14 in pure electric mode and will use this electrical energy to meet the driver's stop and go demands. When the state of charge of battery 12 is below a certain desired value, then engine 14 may be turned on to operate at a steady state operating condition to charge battery 12 while the stop and go type driver demands will be met through the electrical path. Such a mechanism may also result in improved fuel efficiency while maintaining drivability.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for controlling a vehicle motive power system comprising:
   determining a driver positive power demand history and a driver negative power demand history;
   determining whether a difference between the positive power demand history and the negative power demand history is greater than a predetermined threshold; and
   controlling the motive power system based on whether the difference between the positive power demand history and the negative power demand history is greater than the predetermined threshold.

2. The method of claim 1, wherein the motive power system includes a brake pedal, further comprising determining the number of times the brake pedal is pressed during a predetermined duration of time.

3. The method of claim 1, wherein the motive power system includes an acceleration pedal, further comprising determining the number of times the acceleration pedal is pressed during a predetermined duration of time.

4. The method of claim 1 further comprising measuring vehicle speed and determining a duration of time during which the vehicle speed is greater than another predetermined threshold.

5. The method of claim 4 wherein the motive power system is further controlled based on the duration of time during which the vehicle speed is greater than the another predetermined threshold.

6. The method of claim 1 further comprising measuring vehicle speed and determining a duration of time during which the vehicle speed is less than another predetermined threshold.

7. The method of claim 6 wherein the motive power system is further controlled based on the duration of time during which the vehicle speed is less than the another predetermined threshold.

8. A method for controlling a motive power system of a vehicle, the method comprising:
   receiving input from at least one of an accelerator pedal and brake pedal;
   determining a driver positive power demand history and a driver negative power demand history based on the input;
   determining whether a difference between the driver positive power demand history and the driver negative power demand history is greater than a predetermined threshold; and
   controlling the motive power system based on whether the difference between the driver positive power demand history and the driver negative power demand history is greater than the predetermined threshold.

9. The method of claim 8 further comprising measuring vehicle speed, wherein determining the driver positive power demand history and the driver negative power demand history is further based on the measured vehicle speed.

10. The method of claim 8 further comprising measuring vehicle speed and determining a duration of time during which the vehicle speed is less than another predetermined threshold.

11. A system for controlling a motive power system of a vehicle, the system comprising:
   one or more controllers configured to receive input from at least one of an accelerator pedal and brake pedal, to determine a driver positive power demand history and a driver negative power demand history based on the input, to determine whether a difference between the driver positive power demand history and the driver negative power demand history is greater than a predetermined threshold, and to control the motive power system based on whether the difference between the driver positive power demand history and the driver negative demand history is greater than the predetermined threshold.

12. The system of claim 11 wherein the one or more controllers are further configured to obtain vehicle speed information and to determine the driver positive power demand history and the driver negative power demand history based on the vehicle speed information.

13. The system of claim 11 wherein the one or more controllers are further configured to obtain vehicle speed information and to determine a duration of time during which the vehicle speed is less than another predetermined threshold.

* * * * *